United States Patent
Zhao et al.

(10) Patent No.: US 11,620,436 B2
(45) Date of Patent: Apr. 4, 2023

(54) METHOD FOR DYNAMICALLY DISPLAYING TEXT, APPARATUS, MEDIUM, AND SYSTEM

(71) Applicants: Beijing Jingdong Shangke Information Technology Co., Ltd., Beijing (CN); Beijing Jingdong Century Trading Co., Ltd., Beijing (CN)

(72) Inventors: Zhenhua Zhao, Beijing (CN); Lingzhi Wang, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 609 days.

(21) Appl. No.: 16/477,844

(22) PCT Filed: Jan. 11, 2018

(86) PCT No.: PCT/CN2018/072284
§ 371 (c)(1),
(2) Date: Jul. 12, 2019

(87) PCT Pub. No.: WO2018/149257
PCT Pub. Date: Aug. 23, 2018

(65) Prior Publication Data
US 2019/0361963 A1    Nov. 28, 2019

(30) Foreign Application Priority Data
Feb. 17, 2017  (CN) .......................... 201710086802.2

(51) Int. Cl.
*G06F 40/166* (2020.01)

(52) U.S. Cl.
CPC ................................. *G06F 40/166* (2020.01)

(58) Field of Classification Search
None
See application file for complete search history.

(56) References Cited

U.S. PATENT DOCUMENTS

| 10,228,810 B2 * | 3/2019 | Shin ........................ G06F 3/048 |
| 2003/0131050 A1 | 7/2003 | Vincent |

(Continued)

FOREIGN PATENT DOCUMENTS

| CN | 1450763 A | 10/2003 |
| CN | 101291490 A | 10/2008 |

(Continued)

OTHER PUBLICATIONS

Indonesian Office Action for PID201906097, dated Oct. 7, 2021, 3 pgs.

(Continued)

*Primary Examiner* — Ariel Mercado
(74) *Attorney, Agent, or Firm* — Blank Rome LLP (57) ABSTRACT

A method and device for displaying texts. In one embodiment, the method comprises: in response to detection of a change of an input text, determining a changed text and a location of the change in the input text, and a duration in which the change of the input text occurs (401); determining a change type of changes of the input text (402); performing, on the basis of the changed text, the location, the change type and the duration, an information synthesizing process to generate synthesized information (403); and transmitting to a receiving terminal the synthesized information (404). The method is implemented to dynamically display text information.

20 Claims, 4 Drawing Sheets

(56) References Cited

U.S. PATENT DOCUMENTS

| | | | |
|---|---|---|---|
| 2004/0162877 A1 | 8/2004 | Van Dok | |
| 2007/0124387 A1* | 5/2007 | Galloway | H04L 51/063 709/206 |
| 2011/0289405 A1 | 11/2011 | Fritsch et al. | |
| 2012/0110445 A1 | 5/2012 | Greenspan et al. | |
| 2012/0278401 A1* | 11/2012 | Meisels | G06F 40/166 709/206 |
| 2012/0284093 A1* | 11/2012 | Evans | G06Q 30/0251 705/14.1 |
| 2014/0303960 A1* | 10/2014 | Orsini | G06F 40/232 704/2 |
| 2014/0320507 A1* | 10/2014 | Myung | G06F 3/0488 345/474 |
| 2014/0331126 A1* | 11/2014 | Hunter | G06F 40/197 715/256 |

FOREIGN PATENT DOCUMENTS

| | | |
|---|---|---|
| CN | 101686568 A | 3/2010 |
| CN | 103064885 A | 4/2013 |
| CN | 107547353 A | 1/2018 |
| EP | 2448348 A1 | 5/2012 |
| FR | 2928232 | 9/2009 |
| RU | 2599539 C2 | 10/2016 |

OTHER PUBLICATIONS

International Search Report and Written Opinion for PCT/CN2018/072284, dated Apr. 13, 2018, 7 pgs.
Supplemental European Search Report for PCT/CN2018/072284 dated Nov. 17, 2020.

* cited by examiner

METHOD FOR DYNAMICALLY DISPLAYING TEXT, APPARATUS, MEDIUM, AND SYSTEM

CROSS-REFERENCE TO RELATED APPLICATIONS

This application is a national stage of International Application No. PCT/CN2018/072284, filed on Jan. 11, 2018, which claims priority to Chinese Patent Application No. 201710086802.2, filed on Feb. 17, 2017. Both of the aforementioned applications are hereby incorporated by reference in their entireties.

TECHNICAL FIELD

The present disclosure relates to the field of computer technology, specifically to the field of data processing technology, and more specifically to a method, system and apparatus for displaying a text.

BACKGROUND

With the rapid development of instant messaging applications, text-based communication methods are becoming more widely used. The existing text-based communication method is to write a text by a sending end user and send the text to a receiving end user. The received text is parsed and the text content obtained by parsing is directly presented by the receiving end. However, this method does not have the function of recording text timing, and can only display the text statically.

SUMMARY

The objective of the present disclosure is to propose an improved method, system and apparatus for displaying a text, to solve the technical problem mentioned in the Background section.

In a first aspect, the present disclosure provides a method for displaying a text, including: determining, in response to detecting a change in an input text, a changed text content in the input text, a location where the change occurs, and a length of time of the change in the input text; determining a change type of the change in the input text; performing information synthesis processing to generate synthesized information based on the text content, the location, the change type, and the length of time; and sending the synthesized information to a receiving end, so that the receiving end presents a text change process based on the synthesized information.

In some embodiments, the performing information synthesis processing to generate synthesized information based on the text content, the location, the change type, and the length of time, includes: determining whether a length of the text content is greater than a preset text length threshold; and if the length of the text content is greater than the preset text length threshold, dividing the text content such that lengths of pieces of the divided text content are smaller than or equal to the text length threshold, and for each piece of the divided text content, performing information synthesis processing on the piece of text content, a location corresponding to the piece of text content, a change type corresponding to the piece of text content and a length of time corresponding to the piece of text content to generate a plurality of pieces of synthesized sub-information, and synthesizing the plurality of pieces of synthesized sub-information into the synthesized information.

In some embodiments, the performing information synthesis processing to generate synthesized information based on the text content, the location, the change type, and the length of time, includes: determining whether the length of time is greater than a preset time length threshold; and if the length of time is greater than the preset time length threshold, performing information synthesis processing on the text content, the location, the change type, and the time length threshold to generate the synthesized information.

In some embodiments, the determining, a changed text content in the input text and a location where the change occurs, includes at least one of the following: determining the changed text content in the input text and the location where the change occurs using a text comparison algorithm based on an edit distance and a text comparison algorithm based on a longest common subsequence.

In some embodiments, the sending the synthesized information to a receiving end, so that the receiving end presents a text change process based on the synthesized information, includes: sending, to the receiving end, the synthesized information and information for describing an information synthesizing method used in the information synthesis processing, so that the receiving end presents the text change process based on the synthesized information and the information synthesizing method.

In some embodiments, the sending the synthesized information to a receiving end, includes: sending the synthesized information to the receiving end indirectly by means of a relay server.

In a second aspect, the present disclosure provides a method for displaying a text, including: receiving, synthesized information sent by a sending end, the synthesized information being generated by the sending end by performing information synthesis processing based on a changed text content in an input text, a location where change occurs, a length of time of the change in the input text and a change type of the change in the input text, the text content, the location, the change type and the length of time being determined by the sending end in response to detecting the change in the input text; and presenting a text change process based on the synthesized information.

In some embodiments, the presenting a text change process based on the synthesized information, includes: parsing the synthesized information to obtain the text content, the location, the change type, and the length of time in the synthesized information, and presenting a change process of the text content at the obtained location according to the obtained length of time and the obtained change type.

In some embodiments, the receiving, synthesized information sent by a sending end, includes: receiving the synthesized information and information for describing an information synthesizing method used by the sending end in the information synthesis processing, the synthesized information and information for describing an information synthesizing method being sent by the sending end.

In some embodiments, the receiving, synthesized information sent by a sending end, includes: receiving the synthesized information sent indirectly by the sending end by means of a relay server.

In a third aspect, the present disclosure provides a system for displaying a text, including: a sending end, configured to determine, in response to detecting a change in an input text, a changed text content in the input text, a location where the change occurs, and a length of time of the change in the input text, determine a change type of the change in the input text, perform information synthesis processing to generate synthesized information based on the text content, the location, the change type, and the length of time, and send the synthesized information to a receiving end; the receiving end, configured to receive the synthesized information sent by the sending end, and present a text change process based on the synthesized information.

In some embodiments, the sending end is further configured to determine whether a length of the text content is greater than a preset text length threshold; and if the length of the text content is greater than the preset text length threshold, divide the text content such that lengths of pieces of the divided text content are smaller than or equal to the text length threshold, and for each piece of the text content, performing information synthesis processing on the piece of text content, a location corresponding to the piece of text content, a change type corresponding to the piece of text content and a length of time corresponding to the piece of text content to generate a plurality of pieces of synthesized sub-information, and synthesize the plurality of pieces of synthesized sub-information into the synthesized information.

In some embodiments, the sending end is further configured to determine whether the length of time is greater than a preset time length threshold, and if the length of time is greater than the preset time length threshold, perform information synthesis processing on the text content, the location, the change type, and the time length threshold to generate the synthesized information.

In some embodiments, the sending end is further configured to determine the changed text content in the input text and the location where the change occurs using a text comparison algorithm based on an edit distance and a text comparison algorithm based on a longest common subsequence.

In some embodiments, the sending end is further configured to send, to the receiving end, the synthesized information and information for describing an information synthesizing method used in the information synthesis processing, so that the receiving end presents the text change process based on the synthesized information and the information synthesizing method.

In some embodiments, the sending end is further configured to send the synthesized information to the receiving end indirectly by means of a relay server.

In some embodiments, the receiving end is further configured to parse the synthesized information to obtain the text content, the location, the change type, and the length of time in the synthesized information, and present a change process of the text content at the obtained location according to the obtained length of time and the obtained change type.

In some embodiments, the receiving end is further configured to receive the synthesized information and information for describing an information synthesizing method used by the sending end in the information synthesis processing, the synthesized information and information for describing an information synthesizing method being sent by the sending end.

In some embodiments, the receiving end is further configured to receive the synthesized information sent indirectly by the sending end by means of a relay server.

In a fourth aspect, the present disclosure provides an apparatus for displaying a text, including: a first determination unit, configured to determine, in response to detecting a change in an input text, a text changed content in the input text, a location where the change occurs, and a length of time of the change in the input text; a second determination unit, configured to determine a change type of the change in the input text; a synthesizing unit, configured to perform information synthesis processing to generate synthesized information based on the text content, the location, the change type, and the length of time; and a sending unit, configured to send the synthesized information to a receiving end, so that the receiving end presents a text change process based on the synthesized information.

In some embodiments, the synthesizing unit includes: a first determination module, configured to determine whether a length of the text content is greater than a preset text length threshold; and a first synthesizing module, configured to, if the length of the text content is greater than a preset text length threshold, divide the text content such that lengths of pieces of the divided text content are smaller than or equal to the text length threshold, and for each piece of the divided text content, performing information synthesis processing on the piece of text content, a location corresponding to the piece of text content, a change type corresponding to the piece of text content and a length of time corresponding to the piece of text content to generate a plurality of pieces of synthesized sub-information, and synthesize the plurality of pieces of synthesized sub-information into the synthesized information.

In some embodiments, the synthesizing unit further includes: a second determination module, configured to determine whether the length of time is greater than a preset time length threshold; and a second synthesizing module, configured to, if the length of time is greater than the preset time length threshold, perform information synthesis processing on the text content, the location, the change type, and the length of time threshold to generate the synthesized information.

In some embodiments, the first determination unit is further configured to: determine the changed text content in the input text and the location where the change occurs using a text comparison algorithm based on an edit distance and a text comparison algorithm based on a longest common subsequence.

In some embodiments, the sending unit is further configured to: send, to the receiving end, the synthesized information and information for describing an information synthesizing method used in the information synthesis processing, so that the receiving end presents the text change process based on the synthesized information and the information synthesizing method.

In some embodiments, the sending unit is further configured to: send the synthesized information to the receiving end indirectly by means of a relay server.

In a fifth aspect, the present disclosure provides an apparatus for displaying a text, including: a receiving unit, configured to receive, synthesized information sent by a sending end, the synthesized information being generated by the sending end by performing information synthesis processing based on a changed text content in an input text, a location where change occurs, a length of time of the change in the input text and a change type of the change in the input text, the text content, the location, the change type and the length of time being determined by the sending end in response to detecting the change in the input text; and a presenting unit, configured to present a text change process based on the synthesized information.

In some embodiments, the presenting unit is further configured to: parse the synthesized information to obtain the text content, the location, the change type, and the length of time in the synthesized information, and present a change process of the text content at the obtained location according to the obtained length of time and the obtained change type.

In some embodiments, the receiving unit is further configured to: receive the synthesized information and information for describing an information synthesizing method used by the sending end in the information synthesis processing, the synthesized information and information for describing an information synthesizing method being sent by the sending end.

In some embodiments, the receiving unit is further configured to: receive the synthesized information sent indirectly by the sending end by means of a relay server.

In a sixth aspect, the present disclosure further provides a terminal, including: one or more processors; and a storage apparatus, for storing one or more programs, where the one or more programs, when executed by the one or more processors, cause the one or more processors to implement the method for displaying a text provided by the present disclosure.

In a seventh aspect, the present disclosure further provides a computer readable medium, storing a computer program thereon, where the program, when executed by a processor, implements the method for displaying a text provided by the present disclosure.

In an eighth aspect, the present disclosure further provides a terminal, including: one or more processors; and a storage apparatus, for storing one or more programs, where the one or more programs, when executed by the one or more processors, cause the one or more processors to implement the method for displaying a text provided by the present disclosure.

In a ninth aspect, the present disclosure further provides a computer readable medium, storing a computer program thereon, the program, when executed by a processor, implements the method for displaying a text provided by the present disclosure.

According to the method, system and apparatus for displaying a text provided by the present disclosure, a changed text content, a location where the change occurs, a length of time and a change type of the change in a text change process are recorded, synthesized information is generated based on the text content, the location, the length of time and the change type, and finally the synthesized information is sent to the receiving end for the receiving end to present a text change process, so that a receiving end user clearly knows the writing order of a sending end user, and more information is provided to dynamically display text information.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
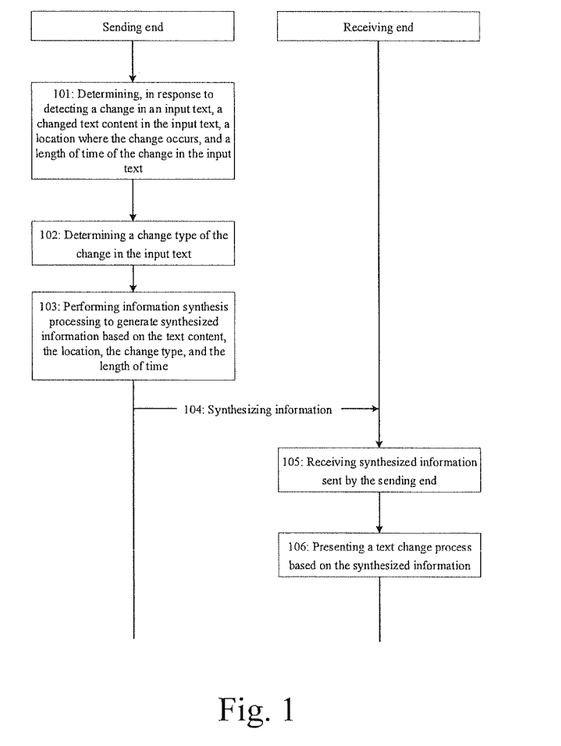
FIG. 1 is a timing diagram of an embodiment of a system for displaying a text according to the present disclosure.

FIG. 1 is a timing diagram of an embodiment of a system for displaying a text according to the present disclosure.

The system for displaying a text of the present embodiment includes: a sending end and a receiving end. Here, the sending end is configured to determine, in response to detecting a change in an input text, a changed text content in the input text, a location where the change occurs, and a length of time of the change in the input text, determine a change type of the change in the input text, perform information synthesis processing to generate synthesized information based on the text content, the location, the change type, and the length of time, and send the synthesized information to the receiving end; and the receiving end, is configured to receive the synthesized information sent by the sending end, and present a text change process based on the synthesized information.

In some alternative implementations of the present embodiment, the system for displaying a text further includes a server. The server is configured to receive the synthesized information sent by the sending end, and send the synthesized information indirectly to the receiving end.

As shown in FIG. 1, in step 101, the sending end determines, in response to detecting a change in an input text, a changed text content in the input text, a location where the change occurs, and a length of time of the change in the input text.

Here, the sending end may detect whether the input text in a text input area (for example, a text box) changes. If the changed input text is detected, the changed text content in the input text and the location where the change occurs may be determined using a text comparison algorithm, and the length of time of the change in the input text may be determined by a monitoring operation. The location where the change occurs may be the location of the changed text content in the input text including the changed text content. The length of time may be a time interval from a start time to an end time of each change of the input text; or a time interval between two end times of two successive changes of the input text. For example, a user first enters "hello", then enters "are you there" after 5 seconds, the length of time for entering "are you there" is 2 seconds, such that the length of time may be 2 seconds or 7 seconds. The changed input text may include adding text to the input text, for example, inserting a word into words, or deleting text from the input text, or replacing a word in the input text with another word.

In some alternative implementations of the present embodiment, the sending end may determine the changed text content in the input text and the location where the change occurs using a text comparison algorithm based on an edit distance, for example, an LD (Levenshtein Distance) algorithm. The LD algorithm, which may also be referred to as the edit distance algorithm, changes a character string A into another character string B by inserting characters, deleting characters, or replacing characters. The number of operations is the difference between the two character strings. As an example, when the character string "kitten" is changed to the character string "sitting", a character string comparison is performed using the LD algorithm, and it may be first determined that "k" at location 1 is replaced with "s", that is, the changed text content is "k" and "s" ("k" is the deleted character during the replacing, and "s" is the added character), and the location where the change occurs is location 1. After that, it may be determined that "e" at location 5 is replaced with "i", that is, the changed text content is "e" and "i" ("e" is the deleted character during the replacing, and "i" is the added character), and the location where the change occurs is location 5. Finally, it may be determined that "g" is added at location 6, that is, the changed text content is "g", and the location where the change occurs is location 6.

In some alternative implementations of the present embodiment, the sending end may alternatively determine the changed text content in the input text and the location where the change occurs based on the text comparison algorithm of the longest common subsequence, for example, the Needleman/Wunsch algorithm. The longest common subsequence of the character string A and the character string B may be found by the Needleman/Wunsch algorithm. The characters in the longest common subsequence does not need to be consecutively arranged in the strings A and B, but the order of the characters need to be consistent with the strings A and B. For example, when the character string "GGATC" is changed to the character string "GAATTCA", a character string comparison is performed by the Needleman/Wunsch algorithm, and it may be determined that the longest common subsequence of the character string "GGATC" and the character string "GAATTCA" is "GATC". The locations of the longest common subsequence "GATC" may be marked in the character string "GGATC" and the character string "GAATTCA" respectively, and then it may be determined how to change characters not at the locations of the longest common subsequence. First, "G" at location 2 may be replaced with "A", that is, the changed text content is "G" and "A" ("G" is the deleted character during the replacing, and "A" is the added character), and the location where the change occurs is location 2. After that, the character "T" may be added to location 4, that is, the changed text content is "T", and the location where the change occurs is location 4. Finally, the character "A" may be added at location 7, that is, the changed text content is "A", and the location where the change occurs is location 7.

In step 102, the sending end determines a change type of the change in the input text.

Here, the sending end may determine a change type of the change in the input text. The change type may include at least one of the following: adding, deleting, or replacing. For example, the change type of changing the character string "abc" to "abcd" is adding; the change type of changing the character string "abc" to the character string "bc" is deleting; and the change type of changing the character string "ab" to "ac" is replacing. The sending end may also use the text comparison algorithm, such as the text comparison algorithm based on the edit distance and the text comparison algorithm based on the longest common subsequence, to determine the change type in the input text.

In step 103, the sending end performs information synthesis processing to generate synthesized information based on the text content, the location, the change type, and the length of time.

Here, the sending end may perform information synthesis processing to generate synthesized information based on the changed text content, the location where the change occurs, the change type of the change in the input text, and the length of time of the change in the input text.

Here, the sending end and the receiving end may obtain the information synthesizing method from the server. In order to implement the content of the present disclosure more flexibly, for reserved keywords in the information synthesizing method (such as "a", "d", "r", "[", "]", "/", "/", or "{", "}" below), the server may process as follows: first, a constant identifier (ID) maybe defined for each reserved keyword, which may also be referred to as an operation type identifier. For example, the operation type identifier of the reserved keyword "a" is set to "00010010", the operation type identifier of the reserved keyword "[" is set to "00010101", and the operation type identifier of the reserved keyword "]" is set to "00010111" or the like. After that, the corresponding relationship between the operation type identifier and the reserved keyword is written in the information synthesizing method.

It should be noted that the reserved keywords "a", "[", "]", etc. are configurable, and are only used as aliases to improve the readability of the information synthesizing method. In order to be distinguished from the characters normally input, the reserved keywords are generally set as complicated keywords. In practice, the reserved keyword "[ ]" may be set to "<:time></:time>". Generally, the reserved keyword "[" and the reserved keyword "]" need to be used as a pair, and the reserved keyword "/" and the reserved keyword "/" need to be used as a pair.

As an example, information between the reserved keywords in the information synthesizing method in the server may be set as follows: the information between the reserved keyword "[" and the reserved keyword "]" is a length of time in milliseconds, and the reserved keyword "[]" may alternatively be set to "<:time></:time >". The information between the reserved keyword "/" and the reserved keyword "/" is a location where the change occurs, and the reserved keyword "//" may alternatively be set to "<:location></:location>". The information between the reserved keyword "." and the reserved keyword "." is the changed text content, and the reserved keyword ".." may alternatively be set to "<:content></:content>". The information between the reserved keyword "{" and the reserved keyword "}" is the change type, and the reserved keyword "{ }" may alternatively be set to "<:type></:type>". The reserved keyword "a" is set as the change type denoting adding, the reserved keyword "d" is set as the change type denoting deleting, and the reserved keyword "r" is set as the change type denoting replacing. When the change type is replacing, the characters deleted during the replacing are placed in front of and separated by the character "," from the added characters, and if there are many successive locations for the deleted characters, the character "-" maybe set between the start position and the end position. For example, position 1 to position 9 may be expressed as "/1-9/".

Before the sending end interacts with the receiving end, the information synthesizing method may be first obtained from the server. Afterwards, each operation type identifier in the information synthesizing method may be parsed to obtain the alias of the reserved keyword corresponding to each operation type identifier. Then, for each operation type identifier in the operation type identifiers, the corresponding relationship between the operation type identifier and the alias of the reserved keyword corresponding to the operation type identifier may be saved. Finally, an information synthesizing operation may be performed according to the operation type identifier or the alias of the reserved keyword.

For example, when it is determined that the changed text content in the input text is "hello", the location where the change occurs is the first location and the second location, the length of time is 1 second, and the change type is adding, the sending end may fill "hello" in the reserved keyword ".." or "<:content></:content>", fill location 1 and location 2 in the reserved keyword "//" or "<:location></:location>", fill the length of time 1 second in the reserved keyword "[ ]" or "<:time></:time >", and fill the reserved keyword "a" corresponding to the change type adding to the reserved keyword "{ }" or "<:type></:type>". Finally, the generated synthesized information is "[1000]/1-2/.hello.{a}".

In some alternative implementations of the present embodiment, after obtaining the changed text content, the sending end may first determine whether the length of the text content is greater than a preset text length threshold; and divide the text content such that each of lengths of the pieces of the divided text content is smaller than or equal to the text length threshold, if the length of the text content is greater than a preset text length threshold. Then, for each of the pieces of text content, the sending end may perform information synthesis processing on the piece of the text content, the location where the change occurs corresponding to the piece of text content, the change type corresponding to the piece of text content and the length of time of the change corresponding to the piece of text content to generate pieces of synthesized sub-information, and synthesize a plurality of synthesized sub-informations into the synthesized information.

In some alternative implementations of the present embodiment, after obtaining the length of time of the change in the input text, the sending end may first determine whether the length of time is greater than a preset length of time threshold; and perform information synthesis processing on the changed text content, the location where the change occurs, the change type, and the length of time threshold to generate the synthesized information, if the length of time is greater than a preset time length threshold.

In step 104, the sending end sends the synthesized information to the receiving end.

Here, the sending end may send the synthesized information to the receiving end, so that the receiving end presents a text change process based on the synthesized information. The sending end may send the synthesized information directly to the receiving end.

In some alternative implementations of the present embodiment, the sending end may send to the receiving end, information for describing the information synthesizing method together with the synthesized information. The information synthesizing method is a method used by the sending end in the process of performing the information synthesis processing. When the receiving end receives the synthesized information and the information for describing the information synthesizing method, the receiving end may present the text change process based on the synthesized information and the information synthesizing method.

In some alternative implementations of the present embodiment, the sending end may send the synthesized information and the information for describing the information synthesizing method to the receiving end indirectly by means of a relay server.

In step 105, the receiving end receives synthesized information sent by the sending end.

Here, the receiving end may receive the synthesized information sent by the sending end by using a wireless connection method or a wired connection method.

In some alternative implementations of the present embodiment, the receiving end may receive the information for describing the information synthesizing method sent by the sending end while receiving the synthesized information sent by the sending end. The information synthesizing method is a method used by the sending end in the process of performing the information synthesis processing.

In some alternative implementations of the present embodiment, the receiving end may receive the synthesized information and the information for describing the information synthesizing method sent indirectly by the sending end using a relay server.

In step 106, the receiving end presents a text change process based on the synthesized information.

Here, the receiving end may parse the received synthesized information and present a text change process based on the content in the parsed synthesized information.

In some alternative implementations of the present embodiment, the receiving end may parse the synthesized information from the information synthesizing method obtained in the server or the received information synthesizing method sent by the sending end. After the text content, the location, the change type, and the length of time in the synthesized information are obtained by parsing, the change process of the text content may be presented with the obtained change type at the obtained location according to the obtained length of time.

As an example, after the receiving end receives the synthesized information "[1000]/1-2/.hello.{a}", the method of parsing the synthesized information may be as follows: after reading the operation type identifier of the reserved keyword "[ ]", it may be concluded that the content in "[ ]" represents the length of time in milliseconds; after reading the operation type identifier of the reserved keyword "//", it may be concluded that the content in "//" represents the location where the change occurs; after reading the operation type identifier of the reserved keyword "..", it may be concluded that the content in ".." represents the changed text content; after reading the operation type identifier of the reserved keyword "{ }", it may be concluded that the content in "{ }" represents the change type, then the content in the synthesized information may be parsed as: the text "hello" is added to the location 1 and location 2 using 1 second. When parsing location information, before the reserved keyword "-" is the start position, and after the reserved keyword "-" is the end position. The content before the reserved keyword "[" may be an input text before the changed text content, and adjacent to the changed text content.

Figure 2:
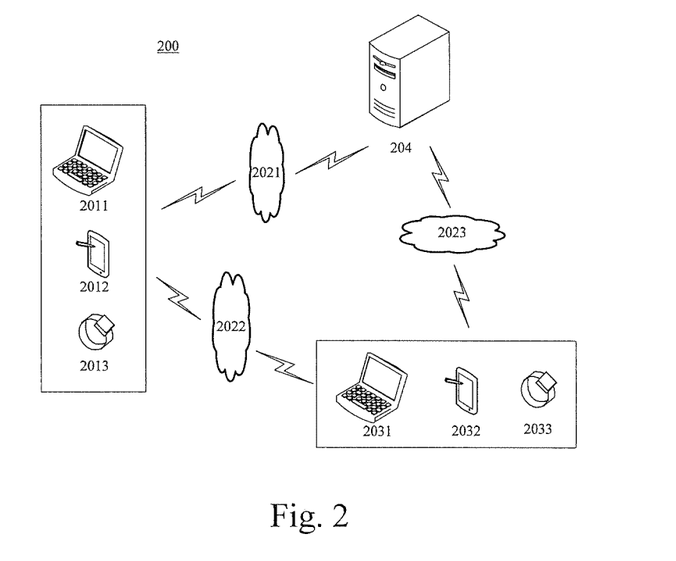
FIG. 2 is an example system architecture diagram of a system for displaying a text according to the present disclosure.

Here, when the sending end needs to indirectly send the synthesized information to the receiving end by means of the server, an example system architecture diagram is shown in FIG. 2. In FIG. 2, a system architecture 200 may include sending terminals 2011, 2012, 2013, networks 2021, 2022, 2023, receiving terminals 2031, 2032, 2033, and a server 204. The network 2021 is configured to provide a communication link medium between the sending terminals 2011, 2012, 2013 and the server 204; the network 2022 is configured to provide a communication link medium between the sending terminals 2011, 2012, 2013 and the receiving terminals 2031, 2032, 2033; the network 2023 is configured to provide a communication link medium between the receiving terminals 2031, 2032, 2033 and the server 204. The networks 2021, 2022, 2023 may include a variety of connections, such as wired, wireless communication links, optic fibers, or the like.

The user may use the sending terminals 2011, 2012, 2013 to interact with the server 204 through the network 2021 to send synthesized information or the like to the receiving terminals 2031, 2032, 2033 through the network 2023 indirectly using the server 20. The user may alternatively use the sending terminals 2011, 2012, 2013 to interact with the receiving terminals 2031, 2032, 2033 through the network 2022 to directly send the synthesized information or the like to the receiving terminals 2031, 2032, 2033. Various communication client applications, such as instant messaging software, may be installed on the sending terminals 2011, 2012, 2013 and the receiving terminals 2031, 2032, 2033.

The sending terminals 2011, 2012, 2013 and the receiving terminals 2031, 2032, 2033 may be various electronic devices having display screens and supporting information processing, message sending and receiving, including but not limited to smart phones, tablets, smart watches, laptop portable computers, desktop computers, etc.

The server 204 may be a server that provides various services, such as a background server that provides support for the synthesized information generated on the sending terminals 2011, 2012, 2013. The background server may receive the synthesized information from the sending terminals 2011, 2012, 2013, and then send the synthesized information to the receiving terminals 2031, 2032, 2033.

It should be understood that the number of terminal devices, networks, and servers in FIG. 2 is merely illustrative. Depending on the implementation needs, there may be any number of terminal devices, networks, and servers.

Figure 3A:
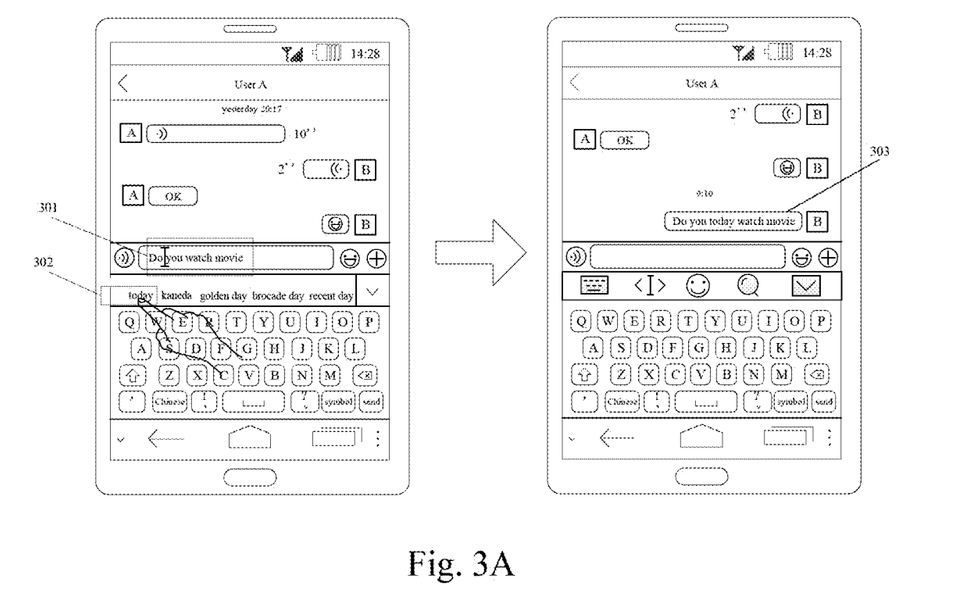
FIG. 3A is a schematic diagram of a process of changing an input text according to the present disclosure.

With further reference to FIG. 3A, FIG. 3A is a schematic diagram of a process of changing an input text according to the present disclosure. In FIG. 3A, when a user B adds a character "today" 302 between the character "you" and the character "watch" of an input text "Do you watch movie" 301, the sending terminal may detect that the input text 301 is changed, then it may be determined that the changed text content is "today", the location where the change occurs is location 3, the change type is adding, the length of time of the change is 2 seconds, and these pieces of information are synthesized and processed to generate synthesized information "Do you watch movie[2000]/3/.today.{a}". When the user B clicks the "send" button, the sending end of the user B presents the information "Do you today watch movie" 303, and the sending end sends the synthesized information to the receiving end.

Figure 3B:
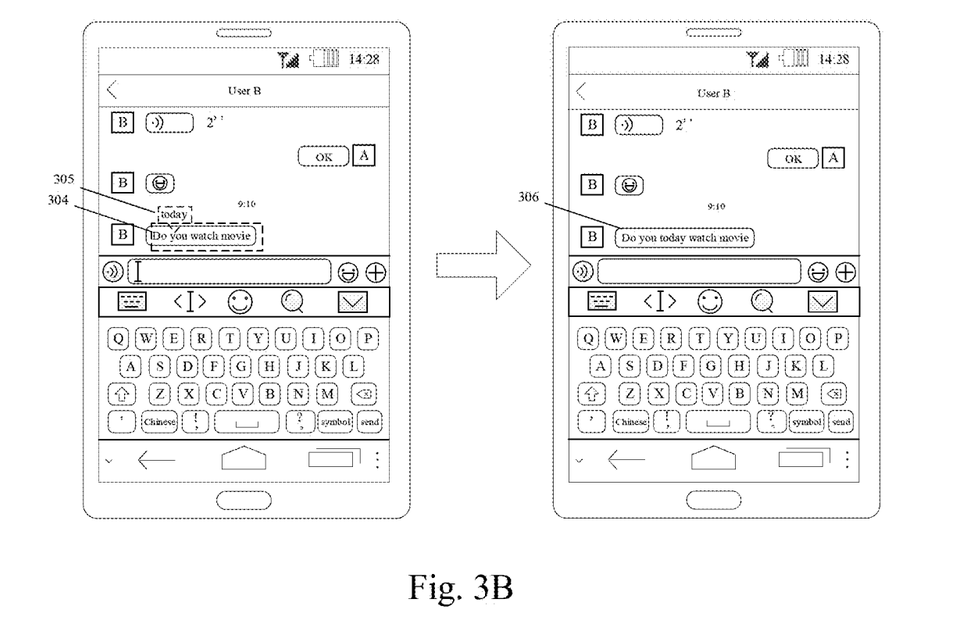
FIG. 3B is a schematic diagram of a presentation process of changing a text according to the present disclosure.

With further reference to FIG. 3B, FIG. 3B is a schematic diagram of a presentation process of changing a text according to the present disclosure. In FIG. 3B, after a receiving end of user A receives the synthesized information, the synthesized information "Do you watch movie[2000]/3/.today.{a}" is parsed. The changed text content obtained by parsing is "today", the location where the change occurs is location 3, the change type is adding, and the length of time of the change is 2 seconds. Then, a time period of 2 seconds is used to dynamically add the changed text content "today" 305 at location 3 (i.e., between the character "you" and the character "watch") of the input text "Do you watch movie". 305, and the finally displayed text is "Do you today watch movie" 306.

Figure 4:
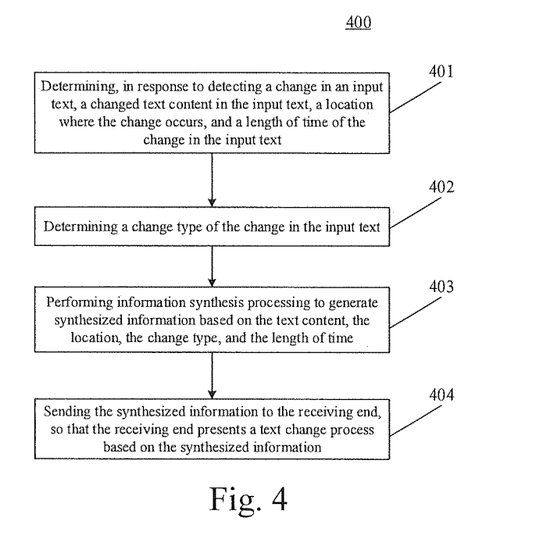
FIG. 4 is a flowchart of an embodiment of a method for displaying a text according to the present disclosure.

FIG. 4 illustrates a flow 400 of an embodiment of a method for displaying a text according to the present disclosure. The method for displaying a text includes the following steps.

Step 401 includes determining, in response to detecting a change in an input text, a changed text content in the input text, a location where the change occurs, and a length of time of the change in the input text.

In the present embodiment, an electronic device (for example, the sending terminal 2011, 2012, 2013 shown in FIG. 2) on which the method for displaying a text is implemented may detect whether the input text changes in an text input area, if the changed input text is detected, the changed text content in the input text and the location where the change occurs may be determined using a text comparison algorithm, and the length of time of the change in the input text may be monitored. The location where the change occurs may be the location of the changed text content in the input text including the changed text content. The length of time may be a time interval from a start time to an end time of each change of the input text; or a time interval between two end times of two successive changes of the input text. The changed input text may include adding text to the input text, for example, inserting text between two texts, or deleting text from the input text, or replacing a word in the input text with another word.

In some alternative implementations of the present embodiment, the electronic device may determine the changed text content in the input text and the location where the change occurs using the text comparison algorithm based on the edit distance, for example, the LD algorithm. The LD algorithm, which may also be referred to as the edit distance algorithm, changes a character string A into another character string B by inserting characters, deleting characters, or replacing characters. The number of operations is the difference between the two character strings. As an example, when the character string "kitten" is changed to the character string "sitting", a character string comparison is performed using the LD algorithm, and it may be first determined that "k" at location 1 is replaced with "s", that is, the changed text content is "k" and "s" ("k" is the character deleted during the replacing, and "s" is the added character), and the location where the change occurs is location 1. After that, it may be determined that "e" at location 5 is replaced with "i", that is, the changed text content is "e" and "i" ("e" is the character deleted during the replacing, and "i" is the added character), and the location where the change occurs is location 5. Finally, it may be determined that "g" is added at location 6, that is, the changed text content is "g", and the location where the change occurs is location 6.

In some alternative implementations of the present embodiment, the electronic device may alternatively determine the changed text content in the input text and the location where the change occurs based on the text comparison algorithm of the longest common subsequence, for example, the Needleman/Wunsch algorithm. The longest common subsequence of the character string A and the character string B may be found by the Needleman/Wunsch algorithm. The characters in the longest common subsequence does not need to be consecutively arranged in the strings A and B, but the order of the characters need to be consistent with the strings A and B. For example, when the character string "GGATC" is changed to the character string "GAATTCA", a character string comparison is performed by the Needleman/Wunsch algorithm, and it may be determined that the longest common subsequence of the character string "GGATC" and the character string "GAATTCA" is "GATC". The location of the longest common subsequence "GATC" may be marked in the character string "GGATC" and the character string "GAATTCA" respectively, and then it may be determined how to change characters not at the locations of the longest common subsequence. First, "G" at location 2 may be replaced with "A", that is, the changed text content is "G" and "A" ("G" is the character deleted during the replacing, and "A" is the added character), and the location where the change occurs is location 2. After that, the character "T" may be added to location 4, that is, the changed text content is "T", and the location where the change occurs is location 4. Finally, the character "A" may be added at location 7, that is, the changed text content is "A", and the location where the change occurs is location 7.

Step 402 includes determining a change type of the change in the input text.

In the present embodiment, the electronic device may determine a change type of the change in the input text. The change type may include at least one of the following: adding, deleting, or replacing. For example, the change type of changing the character string "abc" to "abcd" is adding; the change type of changing the character string "abc" to the character string "bc" is deleting; and the change type of changing the character string "ab" to "ac" is replacing. The electronic device may also use the text comparison algorithm, such as the text comparison algorithm based on the edit distance and the text comparison algorithm based on the longest common subsequence, to determine the change type in the input text.

Step 403 includes performing information synthesis processing to generate synthesized information based on the text content, the location, the change type, and the length of time.

In the present embodiment, the electronic device may perform information synthesis processing to generate synthesized information based on the changed text content, the location where the change occurs, the change type of the change, and the length of time of the change.

In the present embodiment, the electronic device and the receiving end may obtain the information synthesizing method from the server. In order to implement the content of the present disclosure more flexibly, for reserved keywords in the information synthesizing method, the server may process as follows: first, a constant identifier may be defined for each reserved keyword, which may also be referred to as an operation type identifier. For example, the operation type identifier of the reserved keyword "d" is set to "00010011", the operation type identifier of the reserved keyword "r" is set to "00010100", or the like. After that, the corresponding relationship between the operation type identifier and the reserved keyword is written in the information synthesizing method.

It should be noted that the reserved keywords "d", "r", etc. are configurable, and are only used as aliases to improve the readability of the information synthesizing method. In order to be distinguished from the characters normally input, the reserved keywords are generally set as complicated keywords. In practice, the reserved keyword "//" may be set to "<:location></:location>". Generally, the reserved keyword "[", the reserved keyword "]" need to be used as a pair, and the reserved keyword "/" and the reserved keyword "/" need to be used as a pair.

As an example, information between the reserved keywords in the information synthesizing method in the server may be set as follows: the information between the reserved keyword "[" and the reserved keyword "]" is a length of time in milliseconds, and the reserved keyword "[ ]" may alternatively be set to "<:time></:time>". The information between the reserved keyword "/" and the reserved keyword "/" is a location where the change occurs, and the reserved keyword "//" may alternatively be set to "<:location></:location>". The information between the reserved keyword "." and the reserved keyword "." is the changed text content, and the reserved keyword ".." may alternatively be set to "<:content></:content>". The information between the reserved keyword "{" and the reserved keyword "}" is the change type, and the reserved keyword "{ }" may alternatively be set to "<:type></:type>". The reserved keyword "a" is set as the change type denoting adding, the reserved keyword "d" is set as the change type denoting deleting, and the reserved keyword "r" is set as the change type denoting replacing. When the change type is replacing, the characters deleted during the replacing are placed in front of and separated by the character "," from the added characters, and if there are many successive locations for the deleted characters, the character "-" maybe set between the start position and the end position.

Before the electronic device interacts with the receiving end, the information synthesizing method may be first obtained from the server. Afterwards, each operation type identifier in the information synthesizing method may be parsed to obtain the alias of the reserved keyword corresponding to each operation type identifier. Then, for each operation type identifier in the operation type identifiers, the corresponding relationship between the operation type identifier and the alias of the reserved keyword corresponding to the operation type identifier may be saved. Finally, an information synthesizing operation may be performed according to the operation type identifier or the alias of the reserved keyword.

For example, when the changed text content is "hello", the locations where the change occurs are location 3 and location 4, the length of time is 2 seconds, and the change type is adding, the synthesized information synthesized according to the information synthesizing method may be "[2000]/3,4/.are you there.{a}". If the user enters "hello" before "are you there", the synthesized information may be "hello[2000]/3,4/.are you there.{a}". If the user deletes "are you there" after 5 seconds, and the length of time for deleting "are you there" is 1 second, then the synthesized information may be "hello are you there[6000]/3,4/.are you there.{d}".

In some alternative implementations of the present embodiment, after obtaining the changed text content, the electronic device may first determine whether the length of the text content is greater than a preset text length threshold, and divide the text content such that the lengths of the pieces of the divided text content are smaller than or equal to the text length threshold, if the length of the text content is greater than a preset text length threshold. Then, for each piece of text content, the electronic device may perform information synthesis processing on the piece of text content, the location where the change occurs corresponding to the piece of text content, the change type corresponding to the piece of text content and the length of time of the change corresponding to the piece of text content to generate pieces of synthesized sub-information, and synthesize a plurality of pieces of synthesized sub-information into the synthesized information.

In some alternative implementations of the present embodiment, after obtaining the length of time of the change in the input text, the electronic device may first determine whether the length of time is greater than a preset time length threshold, and perform information synthesis processing on the changed text content, the location where the change occurs, the change type, and the time length threshold to generate the synthesized information, if the length of time is greater than the preset time length threshold.

As an example, the user enters "I want to watch movie with you" 12 seconds after "Do you have time today?", and it takes 3 seconds for entering "I want to watch movie with you". When the preset time length threshold is 10 seconds, the length of time 15 seconds is greater than the time length threshold 10 seconds. Then, information synthesis processing is performed on the text content "I want to watch movie with you", the location 9 to location 15 corresponding to the text content, the length of time threshold 10 seconds, and the change type adding, and the synthesized information is "Do you have time today? [10000]/9-15/.1 want to watch movie with you.{a}".

Step 404 includes sending the synthesized information to the receiving end, so that the receiving end presents a text change process based on the synthesized information.

In the present embodiment, after the synthesized information is generated in step 403, the electronic device may send the synthesized information to the receiving end communicating with the electronic device, so that the receiving end presents a text change process based on the synthesized information. The electronic device may directly send the synthesized information to the receiving end, or may send the synthesized information to the receiving end indirectly by means of a relay server. The receiving end may parse the synthesized information according to a preset information parsing method. After obtaining the text content, the location, the change type, and the length of time in the synthesized information by parsing, the receiving end may present the change process of the text content in the obtained change type at the obtained location according to the obtained length of time.

In some alternative implementations of the present embodiment, the electronic device may send to the receiving end, information for describing the information synthesizing method together with the synthesized information. The information synthesizing method is a method used by the electronic device in the process of performing the information synthesis processing. When the receiving end receives the synthesized information and the information for describing the information synthesizing method, the receiving end may present the text change process based on the synthesized information and the information synthesizing method.

In some alternative implementations of the present embodiment, the electronic device may send the synthesized information and the information for describing the information synthesizing method to the receiving end indirectly by means of the relay server.

According to the method for displaying a text provided by the above embodiment of the present disclosure, a changed text content, a location where the change occurs, a length of time of the change and a change type in a text change process are recorded, synthesized information is generated based on the text content, the location, the length of time and the change type, and finally the synthesized information is sent to the receiving end for the receiving end to present the text change process, so that a receiving end user clearly knows the writing order of a sending end user, and more information is provided to dynamically display text information.

Figure 5:
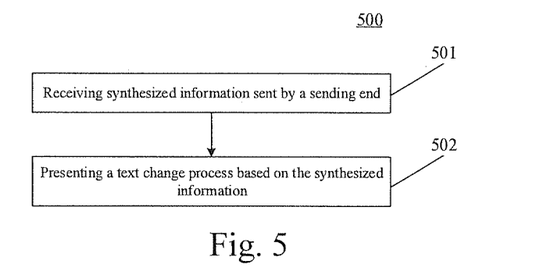
FIG. 5 is a flowchart of another embodiment of the method for displaying a text according to the present disclosure.

With further reference to FIG. 5, illustrating a flow 500 of another embodiment of the method for displaying a text. The flow 500 of the method for displaying a text includes the following steps.

Step 501 includes receiving synthesized information sent by a sending end.

In the present embodiment, an electronic device (for example, the sending terminal 2011, 2012, 2013 shown in FIG. 2) on which the method for displaying a text is implemented may receive synthesized information sent by a sending end through a wireless connection or a wired connection. The synthesized information is generated by the sending end by performing information synthesis processing based on a changed text content in an input text, a location where the change occurs, a length of time of the change in the input text and a change type of the change in the input text. The sending end may detect whether the input text changes in an text input area, if the changed input text is detected, the changed text content, the location where the change occurs, the length of time of the change in the input text and the change type may be determined using a text comparison algorithm. The text comparison algorithm may be the text comparison algorithm based on the edit distance, for example, the LD algorithm; or the text comparison algorithm based on the longest common subsequence, for example, the Needleman/Wunsch algorithm.

The location where the change occurs may be the location of the changed text content in the input text including the changed text content. The length of time may be a time interval from a start time to an end time of each change of the input text; or two end times of two successive changes of the input text. The change type may include at least one of the following: adding, deleting, or replacing. The synthesized information may be directly sent by the sending end received by the electronic device.

In some alternative implementations of the present embodiment, the electronic device may receive the information for describing the information synthesizing method sent by the sending end while receiving the synthesized information sent by the sending end. The information synthesizing method is a method used by the sending end in the process of performing the information synthesis processing.

In some alternative implementations of the present embodiment, the electronic device may receive the synthesized information and the information for describing the information synthesizing method sent indirectly by the sending end by means of a relay server.

Step 502 includes presenting a text change process based on the synthesized information.

In the present embodiment, the electronic device may parse the received synthesized information and present a text change process based on the content in the parsed synthesized information.

In some alternative implementations of the present embodiment, the electronic device may parse the synthesized information from the information synthesizing method obtained in the server or the received information synthesizing method sent by the sending end. After the text content, the location, the change type, and the length of time in the synthesized information are obtained by parsing, the change process of the text content may be presented in the change type at the location according to the length of time.

As an example, after the electronic device receives the synthesized information "hello[2000]/3-5/.are you there?.{a}", the method of parsing the synthesized information may be as follows: after reading the operation type identifier of the reserved keyword "[ ]", it may be concluded that the content in "[ ]" represents the length of time in milliseconds, and the "hello" before the reserved keyword "[" is text adjacent to and before the changed text content; after reading the operation type identifier of the reserved keyword "//", it may be concluded that the content in "//" represents the location where the change occurs; after reading the operation type identifier of the reserved keyword "..", it may be concluded that the content in ".." represents the changed text content; after reading the operation type identifier of the reserved keyword "{ }", it may be concluded that the content in "{ }" represents the change type, then the content in the synthesized information may be parsed as: adding the text "are your there?" to location 3 to location 5 after the text "hello" using 2 seconds.

The method provided by the above embodiment of the present disclosure receives the synthesized information sent by the sending end and parses the synthesized information to present a text change process, so that the user clearly knows the writing order of the sending end user, and more information is provided to dynamically display text information.

Figure 6:
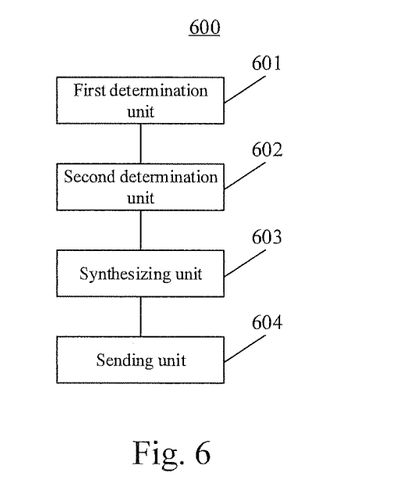
FIG. 6 is a schematic structural diagram of an embodiment of an apparatus for displaying a text according to the present disclosure.

With further reference to FIG. 6, as an implementation of the method shown in the above figures, the present disclosure provides an embodiment of an apparatus for displaying a text, and the apparatus embodiment corresponds to the method embodiment as shown in FIG. 4, and the apparatus may be specifically applied to various electronic devices.

As shown in FIG. 6, the apparatus 600 for displaying a text of the present embodiment includes: a first determination unit 601, a second determination unit 602, a synthesizing unit 603 and a sending unit 604. The first determination unit 601 is configured to determine, in response to detecting a change in an input text, a changed text content in the input text, a location where the change occurs, and a length of time of the change in the input text. The second determination unit 602 is configured to determine a change type of the change in the input text. The synthesizing unit 603 is configured to perform information synthesis processing to generate synthesized information based on the text content, the location, the change type, and the length of time. The sending unit 604 is configured to send the synthesized information to a receiving end, so that the receiving end presents a text change process based on the synthesized information.

In the present embodiment, the first determination unit 601 of the apparatus 600 for displaying a text may detect whether the input text changes in an text input area, if a changed input text is detected, the changed text content in the input text and the location where the change occurs may be determined using a text comparison algorithm, and the length of time of the change in the input text may be monitored. The location where the change occurs may be the location of the changed text content in the input text including the changed text content. The length of time may be a time interval from a start time to an end time of each change of the input text; or a time interval between two end times of two successive changes of the input text. The input text may be changed by adding text to the input text, or deleting text from the input text, or replacing a word in the input text with another word.

In the present embodiment, the second determination unit 602 of the apparatus 600 for displaying a text may determine the change type of the change in the input text. The change type may include at least one of the following: adding, deleting, or replacing.

In the present embodiment, the synthesizing unit 603 of the apparatus 600 for displaying a text may perform information synthesis processing to generate synthesized information based on the changed text content, the location where the change occurs, the change type of the change, and the length of time of the change. The electronic device and the receiving end may set an information synthesizing method.

In the present embodiment, after the synthesizing unit 603 generates the synthesized information, the sending unit 604 may send the synthesized information to the receiving end communicating with the sending units, so that the receiving end presents a text change process based on the synthesized information. The sending unit 604 may directly send the synthesized information to the receiving end, or may send the synthesized information to the receiving end indirectly by means of a relay server. The receiving end may parse the synthesized information according to a preset information parsing method. After obtaining the text content, the location, the change type, and the length of time in the synthesized information by parsing, the receiving end may present the change process of the text content in the change type at the location according to the length of time.

In some alternative implementations of the present embodiment, the synthesizing unit 603 may include a first determination module (not shown in the figure) and a first synthesizing module (not shown in the figure). After obtaining the changed text content, the first determination module may first determine whether the length of the text content is greater than a preset text length threshold, and divide the text content such that the lengths of the pieces of the dived text content are smaller than or equal to the text length threshold, if the length of the text content is greater than a preset text length threshold. Then, for each piece of text content, the first determination module may perform information synthesis processing on the piece of text content, the location where the change occurs corresponding to the piece of the text content, the change type corresponding to the piece of the text content and the length of time of the change corresponding to the piece of the text content to generate pieces of synthesized sub-information, and synthesize a plurality of pieces of synthesized sub-information into the synthesized information.

In some alternative implementations of the present embodiment, the synthesizing unit 603 may further include a second determination module (not shown in the figure) and a second synthesizing module (not shown in the figure). After obtaining the length of time of the change in the input text, the second determination module may first determine whether the length of time is greater than a preset time length threshold, and perform information synthesis processing on the changed text content, the location where the change occurs, the change type, and the time threshold to generate the synthesized information, if the length of time is greater than the preset time length threshold.

In some alternative implementations of the present embodiment, the first determination unit 601 may determine the changed text content in the input text and the location where the change occurs using the text comparison algorithm based on the edit distance, for example, the LD algorithm. The LD algorithm, which may also be referred to as the edit distance algorithm, changes a character string A into another character string B by inserting characters, deleting characters, or replacing characters. The number of operations is the difference between the two character strings. The first determination unit 601 may alternatively determine the changed text content in the input text and the location where the change occurs based on the text comparison algorithm of the longest common subsequence, for example, the Needleman/Wunsch algorithm. The longest common subsequence of the character string A and the character string B may be found by the Needleman/Wunsch algorithm. The characters in the longest common subsequence does not need to be arranged consecutively in the strings A and B, but the order of the characters needs to be consistent with the strings A and B.

In some alternative implementations of the present embodiment, the sending unit 604 may send, to the receiving end, information for describing the information synthesizing method together with the synthesized information. The information synthesizing method is a method used by the sending unit 604 in the process of performing the information synthesis processing. When the receiving end receives the synthesized information and the information for describing the information synthesizing method, the receiving end may present the text change process based on the synthesized information and the information synthesizing method.

In some alternative implementations of the present embodiment, the sending unit 604 may alternatively send the synthesized information and the information for describing the information synthesizing method to the receiving end indirectly by means of a relay server.

Figure 7:
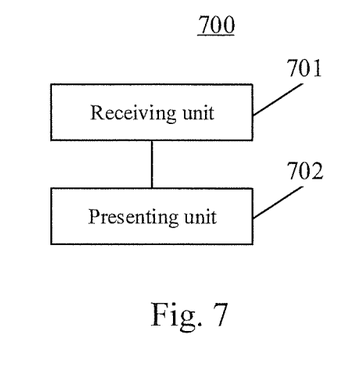
FIG. 7 is a schematic structural diagram of another embodiment of an apparatus for displaying a text according to the present disclosure.

With further reference to FIG. 7, as an implementation of the method shown in the above figures, the present disclosure provides an embodiment of an apparatus for displaying a text, and the apparatus embodiment corresponds to the method embodiment as shown in FIG. 5, and the apparatus may be specifically applied to various electronic devices.

As shown in FIG. 7, the apparatus 700 for displaying a text of the present embodiment includes: a receiving unit 701 and a presenting unit 702. The receiving unit 701 is configured to receive, synthesized information sent by a sending end, the synthesized information being generated by the sending end by performing information synthesis processing based on a changed text content in an input text, a location where the change occurs, a length of time of the change in the input text and a change type of the change in the input text, the text content, the location, the change type and the length of time being determined by the sending end in response to detecting the change in the input text. The presenting unit 702 is configured to present a text change process based on the synthesized information.

In the present embodiment, the receiving unit 701 of the apparatus 700 for displaying a text may receive the synthesized information sent by the sending end by using a wireless connection method or a wired connection method. The synthesized information is generated by the sending end by performing information synthesis processing based on a changed text content in an input text, a location where the change occurs, a length of time of the change in the input text and a change type of the change in the input text. The sending end may detect whether the input text changes in an text input area, if the changed input text is detected, the changed text content, the location where the change occurs, the length of time of the change in the input text and the change type may be determined using a text comparison algorithm.

In the present embodiment, the presenting unit 702 may parse the received synthesized information and present a text change process based on the content in the synthesized information obtained by parsing.

In some alternative implementations of the present embodiment, the presenting unit 702 may parse the synthesized information according to a preset information parsing method. After obtaining the text content, the location, the change type, and the length of time in the synthesized information by parsing, the change process of the text content may be presented in the change type at the location according to the length of time.

In some alternative implementations of the present embodiment, the receiving unit 701 may receive the information for describing the information synthesizing method sent by the sending end while receiving the synthesized information sent by the sending end. The information synthesizing method is a method used by the sending end in the process of performing the information synthesis processing.

In some alternative implementations of the present embodiment, the receiving unit 701 may receive the synthesized information and the information for describing the information synthesizing method sent indirectly by means of a relay server by the sending end.

Figure 8:
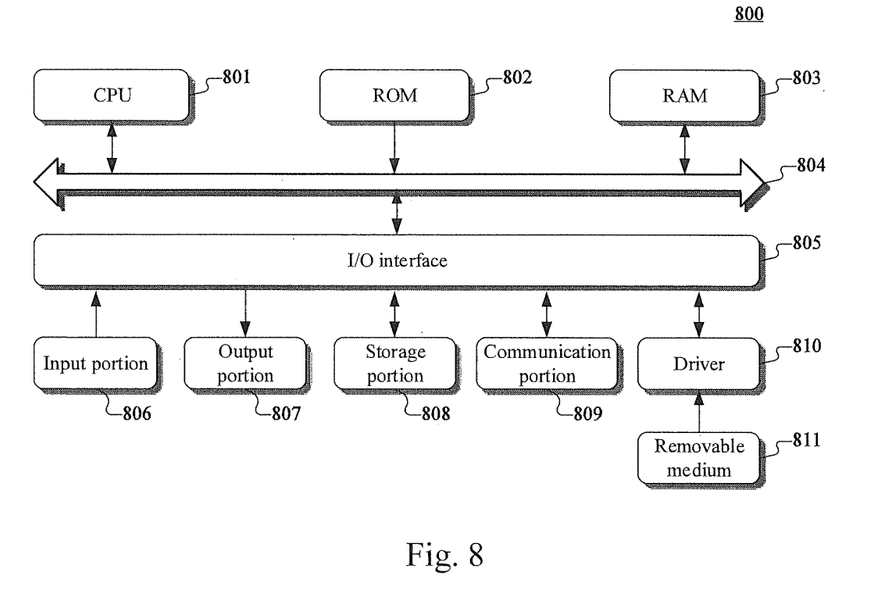
FIG. 8 is a schematic structural diagram of a computer system adapted to implement a terminal device of embodiments of the present disclosure.

Referring to FIG. 8, a schematic structural diagram of a computer system 800 adapted to implement a terminal device of the embodiments of the present disclosure is shown. The terminal device shown in FIG. 8 is merely an example, and should not impose any limitation on the function and scope of use of the embodiments of the present disclosure.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a button etc.; an output portion 807 including such as a liquid crystal display device (LCD), a speaker, etc.; a storage portion 808 including a hard disk and the like; and a communication portion 809 including a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 809, and/or may be installed from the removable medium 811. The computer program, when executed by the central processing unit (CPU) 801, implements the above mentioned functionalities as defined by the method of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a first determination unit, a second determination unit, a synthesizing unit and a sending unit. Here, the names of these units do not in some cases constitute limitations to such units themselves. For example, the sending unit may also be described as "a unit for sending the synthesized information to a receiving end".

The units involved in the embodiments of the present disclosure may be implemented by means of software or hardware. The described units may also be provided in a processor, for example, maybe described as: a processor including a receiving unit and a presenting unit. Here, the names of these units do not in some cases constitute limitations to such units themselves. For example, the receiving unit may also be described as "a unit for receiving synthesized information sent by a sending end".

In another aspect, the present disclosure further provides a computer readable medium. The computer readable medium may be included in the terminal in the above described embodiments, or a stand-alone computer readable medium not assembled into the terminal. The computer readable medium carries one or more programs. The one or more programs, when executed by the terminal, cause the terminal to: determine, in response to detecting a change in an input text, a changed text content in the input text, a location where the change occurs, and a length of time of the change in the input text; determine a change type of the change in the input text; perform information synthesis processing to generate synthesized information based on the text content, the location, the change type, and the length of time; and send the synthesized information to a receiving end, so that the receiving end presents a text change process based on the synthesized information. Alternatively, the non-volatile computer storage medium stores one or more programs. The one or more programs, when executed by a device, cause the device to: receive, synthesized information sent by a sending end, the synthesized information being generated by the sending end by performing information synthesis processing based on a changed text content in an input text, a location where the change occurs, a length of time of the change in the input text and a change type of the change in the input text, the text content, the location, the change type and the length of time being determined by the sending end in response to detecting the change in the input text; and present a text change process based on the synthesized information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for displaying a text, the method comprising:
    determining, in response to detecting a change in an input text, a changed text content in the input text, a location where the change occurs, and a length of time of the change in the input text, wherein the length of time is a time interval from a start time to an end time of the change of the input text, or a time interval between an end time of the change and an end time of a previous change of the input text;

determining a change type of the change in the input text;
performing information synthesis processing to generate synthesized information based on the changed text content, the location, the change type, and the length of time; and
sending the synthesized information to a receiving end to cause the receiving end to dynamically present a text change process, wherein the text change process is dynamically presented by: presenting, within a period of time equal to the length of time, a dynamic change process from the input text to a final text, wherein the dynamic change process comprises combining, at the location, the input text with the changed text content by using the change type.

2. The method according to claim 1, wherein, the performing information synthesis processing to generate synthesized information based on the changed text content, the location, the change type, and the length of time, comprises:
determining whether a length of the changed text content is greater than a preset text length threshold; and
if the length of the changed text content is greater than a preset text length threshold, dividing the changed text content such that lengths of pieces of the divided changed text content are smaller than or equal to the text length threshold, and for each piece of the divided changed text content, performing information synthesis processing on the piece of the divided changed text content, a location corresponding to the piece of the divided changed text content, a change type corresponding to the piece of the divided changed text content and a length of time corresponding to the piece of the divided changed text content to generate a plurality of pieces of synthesized sub-information, and
synthesizing the plurality of pieces of synthesized sub-information into the synthesized information.

3. The method according to claim 1, wherein, the performing information synthesis processing to generate synthesized information based on the changed text content, the location, the change type, and the length of time, comprises:
determining whether the length of time is greater than a preset time length threshold; and
if the length of time is greater than the preset time length threshold, performing information synthesis processing on the changed text content, the location, the change type, and the time length threshold to generate the synthesized information.

4. The method according to claim 1, wherein, the determining, a changed text content in the input text and a location where the change occurs, comprises least one of:
determining the changed text content in the input text and the location where the change occurs using a text comparison algorithm based on an edit distance and a text comparison algorithm based on a longest common subsequence.

5. The method according to claim 1, wherein, the sending the synthesized information to a receiving end, comprises:
sending the synthesized information to the receiving end indirectly by means of a relay server.

6. The method according to claim 1, wherein, the performing information synthesis processing to generate synthesized information based on the changed text content, the location, the change type, and the length of time, comprises:
filling the changed text content, the location, the change type and the length of time in respective different reserved keywords, and using the reserved keywords as the generated synthesized information.

7. The method according to claim 1, wherein the change type is adding, the input text comprises a plurality of characters, and the location is a target location between two characters of the input text,
wherein presenting, within a period of time equal to the length of time, the dynamic change process from the input text to the final text comprises:
within the period of time, presenting the changed text content in vicinity of the two characters of the input text and presenting a process of moving the changed text content to the target location between the two characters of the input text.

8. A method for displaying a text, the method comprising:
receiving, synthesized information sent by a sending end, the synthesized information being generated by the sending end by performing information synthesis processing based on a changed text content in an input text, a location where change occurs, a length of time of the change in the input text and a change type of the change in the input text, the changed text content, the location, the change type and the length of time being determined by the sending end in response to detecting the change in the input text, wherein the length of time is a time interval from a start time to an end time of the change of the input text, or a time interval between an end time of the change and an end time of a previous change of the input text; and
dynamically presenting a text change process based on the synthesized information, wherein the text change process is dynamically presented by: presenting, within a period of time equal to the length of time, a dynamic change process from the input text to a final text, wherein the dynamic change process comprises combining, at the location, the input text with the changed text content by using the change type.

9. The method according to claim 8, wherein, the receiving, synthesized information sent by a sending end, comprises:
receiving the synthesized information and information for describing an infomlation synthesizing method used by the sending end in the infomlation synthesis processing, the synthesized information and the information for describing the information synthesizing method being sent by the sending end.

10. The method according to claim 8, wherein, the receiving, synthesized information sent by a sending end, comprises:
receiving the synthesized information sent indirectly by the sending end by means of a relay server.

11. An apparatus for displaying a text, the apparatus comprising:
at least one processor; and
a memory storing instructions, wherein the instructions when executed by the at least one processor, cause the at least one processor to perform operations, the operations comprising:
determining, in response to detecting a change in an input text, a changed text content in the input text, a location where the change occurs, and a length of time of the change in the input text, wherein the length of time is a time interval from a start time to an end time of the change of the input text, or a time interval between an end time of the change and an end time of a previous change of the input text;

determining a change type of the change in the input text;

performing information synthesis processing to generate synthesized information based on the text content, the location, the change type, and the length of time; and sending the synthesized information to a receiving end to cause the receiving end to dynamically present a text change process, wherein the text change process is dynamically presented by: presenting, within a period of time equal to the length of time, a dynamic change process from the input text to a final text, wherein the dynamic change process comprises combining, at the location, the input text with the changed text content by using the change type.

12. The apparatus according to claim 11, wherein the performing information synthesis processing to generate synthesized information based on the changed text content, the location, the change type, and the length of time, comprises:

determining whether a length of the changed text content is greater than a preset text length threshold; and if the length of the changed text content is greater than a preset text length threshold, dividing the changed text content such that lengths of pieces of the divided changed text content are smaller than or equal to the text length threshold, and for each piece of the divided changed text content, performing information synthesis processing on the piece of the changed text content, a location corresponding to the piece of the divided changed text content, a change type corresponding to the piece of the divided changed text content and a length of time corresponding to the piece of the divided changed text content to generate a plurality of pieces of synthesized sub-information, and synthesizing the plurality of pieces of synthesized sub-information into the synthesized information.

13. The apparatus according to claim 11, wherein the performing information synthesis processing to generate synthesized information based on the changed text content, the location, the change type, and the length of time, comprises the synthesizing unit further comprises:

determining whether the length of time is greater than a preset time length threshold; and if the length of time is greater than the preset time length threshold, performing information synthesis processing on the changed text content, the location, the change type, and the length of time threshold to generate the synthesized information.

14. The apparatus according to claim 11, wherein, the determining, a changed text content in the input text and a location where the change occurs, comprises:

determining the changed text content in the input text and the location where the change occurs using a text comparison algorithm based on an edit distance and a text comparison algorithm based on a longest common subsequence.

15. The apparatus according to claim 11, wherein the sending the synthesized information to a receiving end, so that the receiving end presents a text change process based on the synthesized information, comprises:

sending, to the receiving end, the synthesized information and information for describing an information synthesizing method used in the information synthesis processing, so that the receiving end presents the text change process based on the synthesized information and the information synthesizing method.

16. The apparatus according to claim 11, wherein the sending the synthesized information to a receiving end, comprises:

sending the synthesized information to the receiving end indirectly by means of a relay server.

17. An apparatus for displaying a text, the apparatus comprising: at least one processor; and a memory storing instructions, wherein the instructions when executed by the at least one processor, cause the at least one processor to perform the method according to claim 8.

18. A non-transitory computer readable medium, storing a computer program thereon, wherein the program, when executed by a processor, implements the method according to claim 1.

19. A non-transitory computer readable medium, storing a computer program thereon, wherein the program, when executed by a processor, implements the method according to claim 8.

20. A system for displaying a text, the system comprising the apparatus according to claim 11, and the receiving end, configured to receive the synthesized information, and present the text change process based on the synthesized information.

* * * * *